A. H. FOX & W. J. RICE.
GAS OPERATED AUTOMATIC MACHINE GUN.
APPLICATION FILED APR. 9, 1917.

1,294,892.

Patented Feb. 18, 1919.
8 SHEETS—SHEET 1.

A. H. FOX & W. J. RICE.
GAS OPERATED AUTOMATIC MACHINE GUN.
APPLICATION FILED APR. 9, 1917.

1,294,892.

Patented Feb. 18, 1919.
8 SHEETS—SHEET 2.

A. H. FOX & W. J. RICE.
GAS OPERATED AUTOMATIC MACHINE GUN.
APPLICATION FILED APR. 9, 1917.

1,294,892.

Patented Feb. 18, 1919.
8 SHEETS—SHEET 6.

Inventors
Ansley H. Fox and Walter J. Rice
By Jas. L. Skidmore
Attorney

UNITED STATES PATENT OFFICE.

ANSLEY H. FOX AND WALTER J. RICE, OF PHILADELPHIA, PENNSYLVANIA, ASSIGNORS TO ANSLEY H. FOX COMPANY, OF PHILADELPHIA, PENNSYLVANIA, A CORPORATION OF DELAWARE.

GAS-OPERATED AUTOMATIC MACHINE-GUN.

1,294,892.      Specification of Letters Patent.      Patented Feb. 18, 1919.

Application filed April 9, 1917. Serial No. 160,739.

*To all whom it may concern:*

Be it known that we, ANSLEY H. FOX and WALTER J. RICE, citizens of the United States, residing at Philadelphia, in the county of Philadelphia and State of Pennsylvania, have invented certain new and useful Improvements in Gas-Operated Automatic Machine-Guns, of which the following is a specification.

Our invention relates to rapid-firing, breech-loading gas-actuated guns, and more particularly to gas-actuated automatic machine guns.

The prime object of this invention is to so construct a gas-actuated machine gun as to furnish a maximum of efficiency with a minimum of operating parts.

A further object of the invention is the simplification and strengthening of the mechanism of a rapid-firing, gas-operated automatic machine gun, by which the certainty and reliability of its operation is assured and the various processes of manufacture are made easier and more economical.

Another object of the invention is to provide novel and improved air-cooling means for cooling the barrel of the gun, in connection with the gas-actuated and power-controlling mechanism of the gun.

Another object of this invention is to provide a gas-actuated machine gun which may be readily operated while upside down or in any position, and can be rapidly and easily assembled or disassembled without the use of any particular tool or accessories.

A still further object of the invention is to furnish a simple, strong, durable and economical rapid-firing gas-operated automatic machine gun possessing efficient and novel mechanism hereinafter described.

The foregoing and such other objects as may appear from the ensuing description are attained by the novel features of construction, combination, and arrangements of parts, hereinafter fully described, illustrated in the accompanying drawings, and particularly pointed out in the claims appended hereto, it being understood that slight changes in the form, proportions, and minor details of the construction may be resorted to without departing from the spirit or sacrificing any of the advantages of the invention.

In the accompanying drawings, which form a part of this specification, it will be seen that:—

Fig. 34, and Fig. 36, is a transverse sectional view through the breech-bolt, extractor, and a portion of the receiver, taken on the line 6—6, Fig. 34.

Similar numerals of reference are employed to designate corresponding parts throughout the several figures of the drawings.

Figure 1:
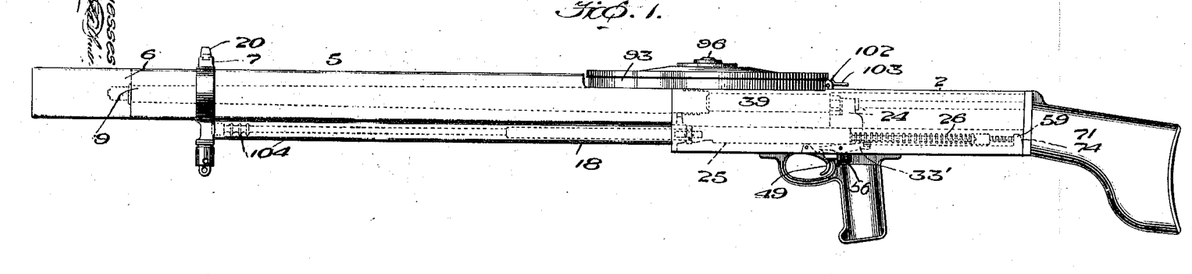
Figure 1, is a longitudinal side elevation of the improved gun embodying our invention showing in dotted lines the mechanism in the act of firing.
Figure 2:
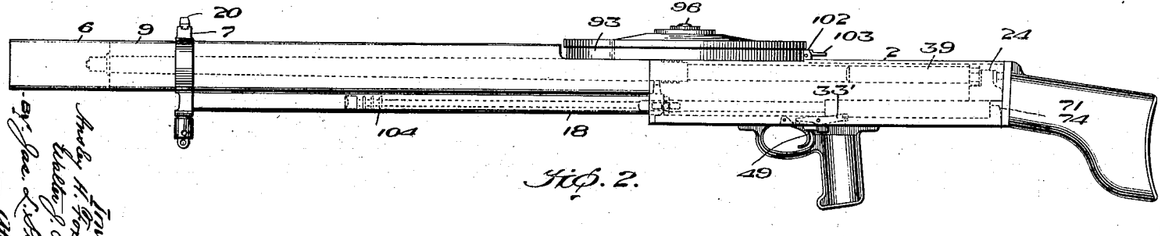
Fig. 2, is a similar view showing in dotted lines the position the mechanism assumes after firing.
Figure 3:
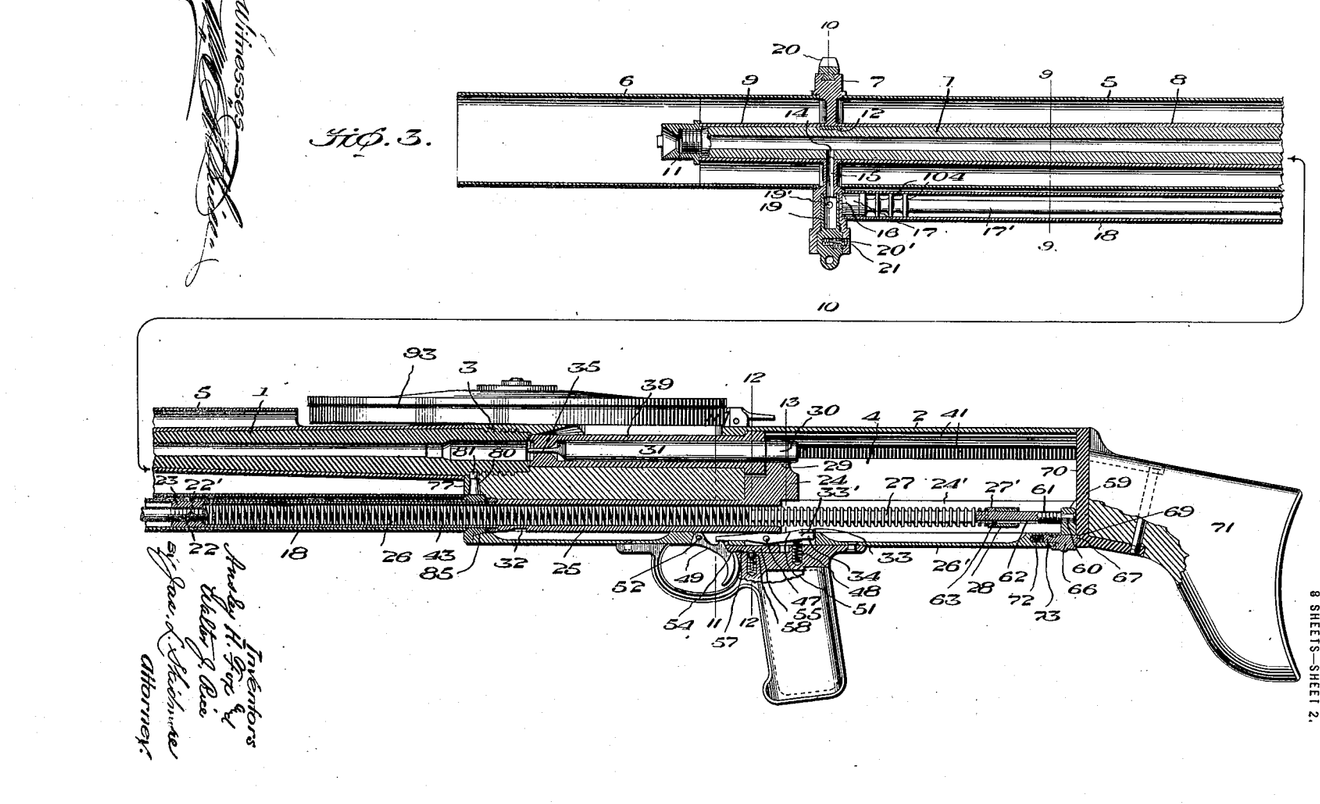
Fig. 3, is a longitudinal sectional view of the gun showing in full lines the position of the mechanism when in the act of firing.
Figures 4, 7:
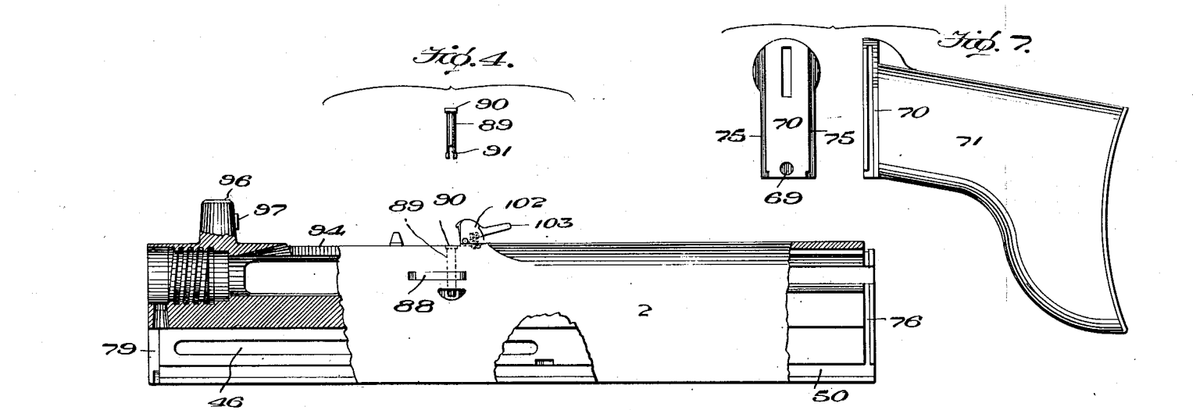
Fig. 4, is a side elevation of the gun receiver broken away showing parts in sectional elevation, and a view in elevation of the ejector securing pin.
Fig. 7, includes a side elevation of the stock of the gun detached therefrom, and an end elevation of said gun stock.
Figures 5, 6:
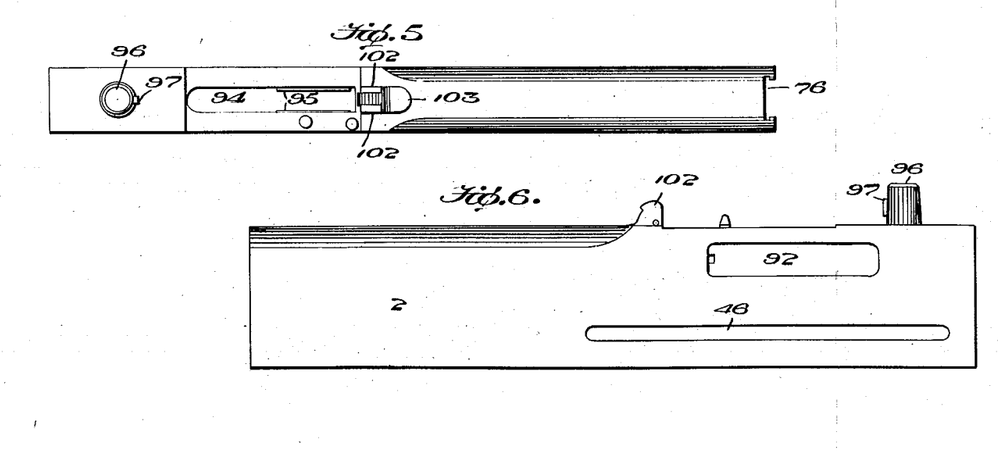
Fig. 5, is a top plan view of the gun receiver shown in Fig. 4.
Fig. 6, is an outside side elevation of the gun receiver.
Figure 8:
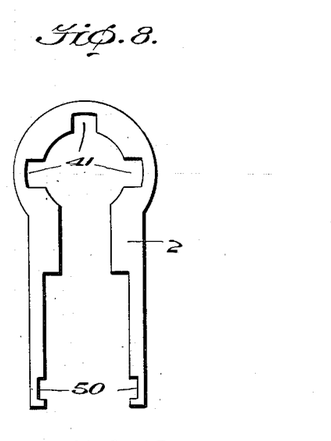
Fig. 8, is an end elevation of the gun receiver.
Figure 9:
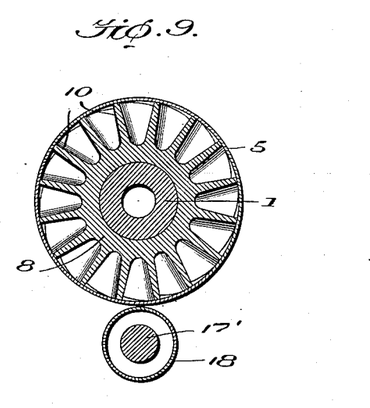
Fig. 9, is a transverse sectional view taken on the line 9—9, Fig. 3.

In the embodiment of our invention as illustrated and which shows a preferred construction, the numeral 1 designates the gun-barrel, and 2 is the gun frame or receiver, to which the gun-barrel is rigidly secured by screw-threads shown at 3, in Figs. 3 and 4. The gun frame or receiver is provided with a longitudinal chamber 4, in line with the bore of the gun-barrel, within which the breech-block and controlling mechanism reciprocates.

Figs. 1, 2, 3, 9 and 10 illustrate our improved means for air-cooling the gun-barrel, which consists of a cylindrical air jacket composed of two sections 5 and 6, each section being open at both ends, the rear section 5 being connected at one end to the gun frame and at its other end to a ring 7 secured to the gun barrel near the forward end portion thereof, said rear section being open at its rear end to freely admit the air which is drawn in over and around the barrel and through the air jacket by the suction created at its forward end caused by the forward rush of powder gases leaving the muzzle of the gun-barrel which barrel is somewhat shorter than the surrounding air jacket, as shown. The forward end or section of the air jacket extends from the ring 7 to a point beyond the muzzle of the gun, its rear end portion being screwed into to the said ring 7. A sleeve also composed of two sections 8 and 9, each section being provided with a series of integral spirally and radially arranged projecting ribs 10, which extend longitudinally, is shown surrounding the gun-barrel and the air as it passes through the air jacket is given a whirling motion between the series of ribs and carries off the heat as it is drawn therethrough. The rear ribbed sleeve section 8 is firmly held between the forward end of the gun frame or receiver and the rear face of the ring, while the forward end of section 9 of the sleeve is held between the said ring 7 and the screw-threaded cap 11 forming the mouth-piece of the gun-barrel and fixedly secured to the screw-threaded end thereof, as clearly shown in Fig. 3.

Figure 10:
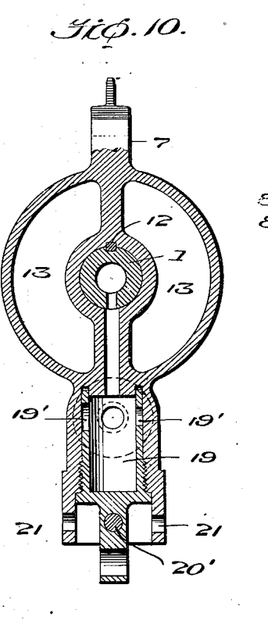
Fig. 10, is a sectional elevation taken on the line 10—10, Fig. 3.
Figure 11:
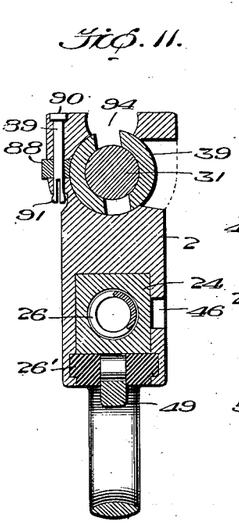
Fig. 11, is a sectional elevation taken on the line 11—11, Fig. 3.
Figure 12:
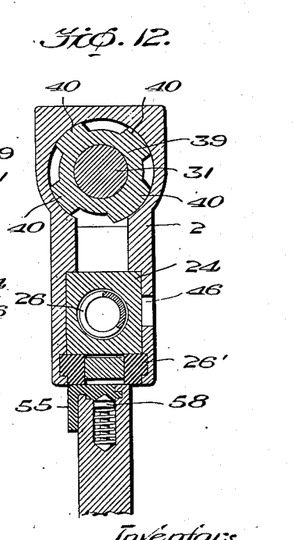
Fig. 12, is a sectional elevation taken on the line 12—12, Fig. 3.

The ring 7 is slid over the muzzle and securely held in place by the forward sleeve section 9 and a suitable key 12 carried by a key-way formed in the gun-barrel by which the ring is prevented from turning, and an opening 13 is provided on either side of the vertical center of the ring to permit the free passage of air therethrough, as clearly shown in Fig. 10.

By thus fixedly securing the ring 7 to the gun-barrel at the point registering with the gas outlet port 14 formed in the gun-barrel, the gas is caused to pass from said port 14 through the vertically disposed opening 15, and the lateral opening 16 formed within the ring, thus conveying the escaping gas from the port 14 in the barrel to the piston head 17 of the gas-operated piston rod 17', and the ring is so formed as to carry the forward end of the tube or casing 18, the cup-shaped attachment 19 provided with means for regulating the flow of gas against the piston-head, and the front gun-sight 20.

The said cup-shaped regulating attachment 19, is screw-threaded to the lower portion of the ring 7, and is provided with a series of different size openings 19′, in the wall of the cup which are readily adjusted to register with the lateral opening 16 leading to the piston-head 17, and said regulating cup is secured to the ring in its suitable adjusted position by a spring operated pin 20′ which engages with the openings 21 in the lower wall of the ring, as shown in Figs. 3 and 10.

The tube or casing 18 is seated within a front plate carried in the forward end portion of the gun frame or receiver 2, and the piston rod 17′ and piston head 17 are adapted to reciprocate within said casing, the rear end of said piston rod being screw-threaded at 22 whereby in connection with the lock pin 22′ it is securely connected to the forward end portion 23, of the reciprocating action slide 24, which slide is provided with a tubular portion 25, extending substantially its entire length and adapted to receive the helical main spring 26, the forward portion of said spring resting in contact with the inner forward end portion of the said slide, and its rear end surrounds a longitudinal guide rod 27, fixedly secured within the receiver to the trigger plate 26′ and rests against the lock washer 27′ of the main spring adjusting nut 28 secured to and carried by said rod.

The said action slide 24 is adapted to reciprocate back and forth within the guideway 24′ formed within gun frame or receiver, its front end portion being fixedly secured to the rear end portion of the piston rod 17′, and its rear end portion having an upward split or recessed extension 29, adapted to straddle and engage the flat or notched end section 30 of the firing pin 31, which is moved back and forth with the slide during its reciprocation, and a cock-notch or recess 32 is milled into the bottom portion of said slide, adapted to engage the projecting rear end 33′, of a sear 34 pivoted to the trigger-plate 26′, the latter being removably secured to and constituting the bottom portion of the gun frame or receiver 2.

The firing pin 31 is flattened near its rear end, so that the split or recessed extension on the slide may be readily put over it at this point, and these flattened surfaces prevent the firing pin from rotating as it is carried back and forth by the slide.

Figure 27:
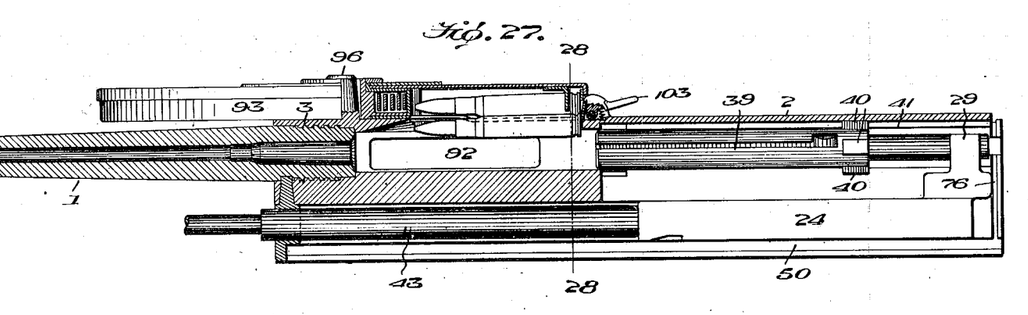
Fig. 27, is a longitudinal sectional view taken through the gun receiver and part of the gun barrel, and showing a cartridge magazine secured to the gun and broken away to show a cartridge being fed into the gun receiver.
Figure 28:
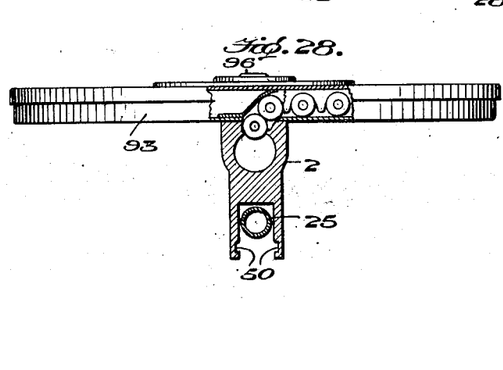
Fig. 28, is a transverse sectional view through the gun receiver and showing a magazine secured to the gun partly broken away to show a cartridge feeding into the gun receiver.
Figure 29:
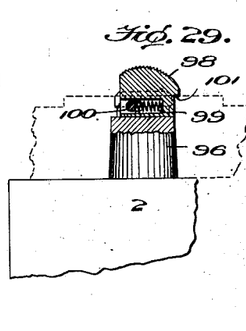
Fig. 29, is a view in elevation showing the magazine securing means partly in section and showing a portion of the magazine in dotted lines.
Figure 30:
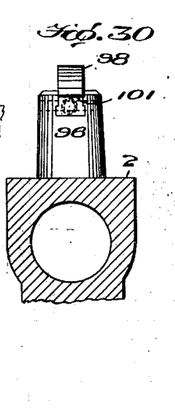
Fig. 30, is a view in elevation showing the magazine securing stud and a portion of the receiver in section.
Figure 31:
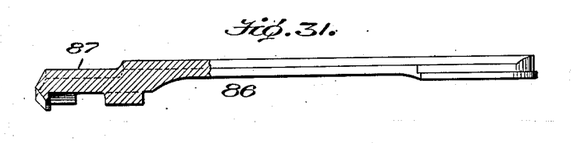
Fig. 31, is a side elevation of the extractor detached from the gun, showing the front end portion in sectional elevation.
Figure 32:
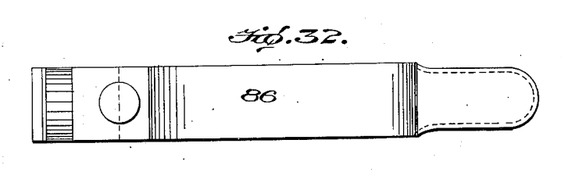
Fig. 32, is an inverted plan view of the extractor detached from the gun.
Figure 33:
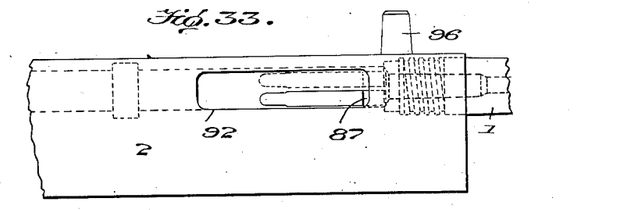
Fig. 33, is a side elevation of a part of the gun receiver and barrel, showing the extractor in full lines when its reduced clearance front end portion is in position to snap over the head of a cartridge, and showing the extractor in dotted lines in the position it would assume when the breech-bolt rotates to lock.
Figure 34:
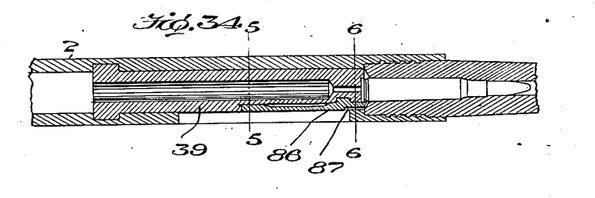
Fig. 34, is a longitudinal sectional plan view showing the reduced front end clearance portion of the extractor between the said extractor and receiver with the extractor in engagement with the head or rim portion of a cartridge.
Figure 35:
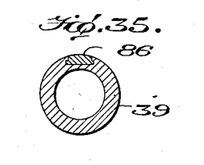
Fig. 35, is a transverse sectional view of the breech-bolt and extractor taken on the line 5—5.
Figure 36:
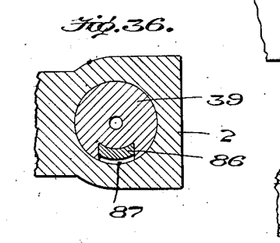

The said firing pin 31 is provided with the usual striking point 35 for exploding the cartridge, and it is also provided with an operating pin 36 which extends transversely through the opening 37 in said pin, and the ends of the operating pin engage in two longitudinally arranged cam slots 38 formed in the breech-bolt or block 39, for the purpose of rotating and reciprocating said bolt or block. As the slide is moved rearward by the gas it carries with it the firing pin, the breech-bolt standing still in the locked position until the operating pin (carried by the firing pin) reaches the cam-shaped section of the operating slots 38 in the bolt, when the rearward motion of the pin 36 serves to rotate and unlock the breech-bolt by camming it around until the locking lugs 40 on the bolt are in line and register with the longitudinal grooves 41 formed in the inner side walls of the receiver, in which position the bolt is then free to move rearwardly, being carried back by the further rearward movement of the operating pin and slide to the position shown in Fig. 27.

The operating pin 36 is formed with reduced diameter on each end and these reduced ends work in the operating slots 38 in the bolt. The middle portion of the operating pin is left full size and neatly fits the opening 37 which carries it.

Figures 13, 14, 15, 16, 17, 18, 19, 20:
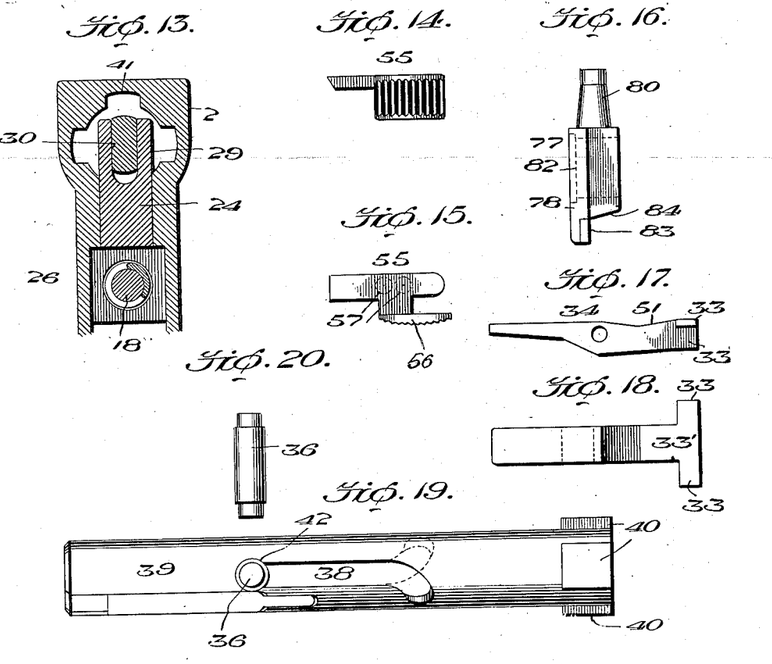
Fig. 13, is a sectional elevation taken on the line 13, Fig. 3.
Fig. 14, is a detail side elevation of the safety slide.
Fig. 15, is a detail plan view of the safety slide.
Fig. 16, is a detail side elevation of the gun barrel retaining device fitted in the forward end of the receiver.
Fig. 17, is a detail side elevation of the sear.
Fig. 18, is a detail plan view of the sear.
Fig. 19, is a detail plan view of the breech-bolt showing the operating slot therein.
Fig. 20, is a detail side elevation of the breech-bolt operating pin.
Figure 21:
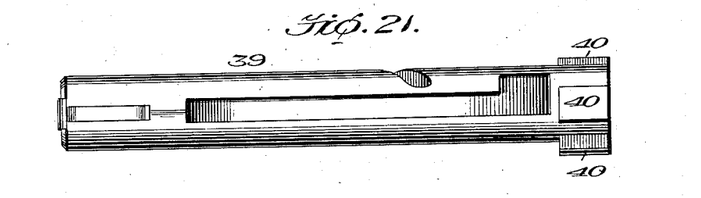
Fig. 21, is a detail side elevation of the breech-bolt.
Figure 22:
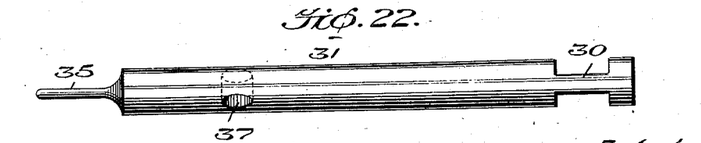
Fig. 22, is a detail plan view of the cartridge firing pin.

It will be seen by reference to Fig. 19 that the forward end of the operating slot in the breech-bolt is enlarged at 42 to allow the full diameter of the operating pin to pass therethrough and into the firing pin at this point as the parts are assembled, and when these parts are placed in their forward position in the receiver the metal around the bolt hole prevents the operating pin from falling out until the parts start to operate when it is obvious that the first movement of the firing pin will move the operating pin past the enlarged opening in the operating slot in the bolt and as soon as this is done the enlarged portion of the operating pin cannot fall out of the operating slot. This enables these parts to be easily taken apart when the bolt is out of the receiver but prevents them coming apart at any other time.

On the round front end section 43 of the slide 24, is mounted a loose sliding ring 44, with a hand operating knob 45. This knob extends through the slot 46 formed in one side of the receiver, so that the slide may be operated from the outside by hand. The hand knob is utilized to hand function the gun for the first shot, after which, of course, the gas will function the gun automatically.

Figure 23:
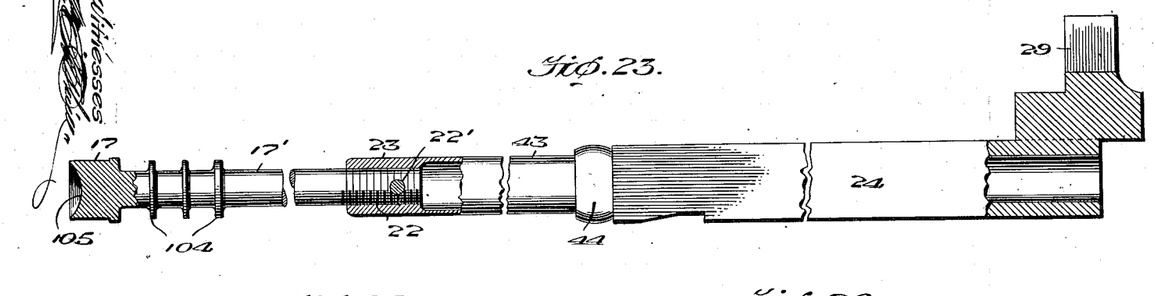
Fig. 23, is a longitudinal side elevation of the operating slide and piston secured thereto, showing the parts broken away and partly in section.

As shown in Fig. 23, this ring 44, carried by the operating knob, allows the front portion of the slide to pass through same, but as the ring is not large enough to let the larger squared portion of the slide to pass through, it is obvious that a rearward motion of the knob will force the slide back and cock the gun. The forward motion of the slide will carry the knob forward again, but after this, while the gas is operating the gun, the knob will not travel back and forth with the slide, but will simply remain in its forward position, while the rounded portion of the slide reciprocates through the ring. This prevents the knob injuring the operator by such rapid and powerful reciprocating movement of the knob as would occur if it were integral with the slide and moved back and forth with same during the firing operation.

Figures 24, 25, 26:
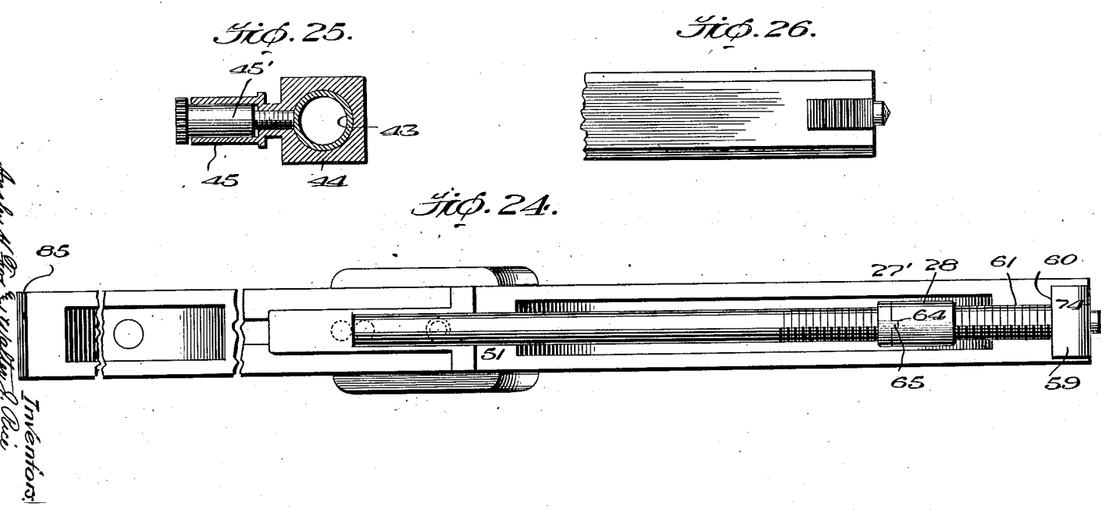
Fig. 24, is a detail plan view of the main spring guiding rod and trigger plate detached from the gun, and showing the spring adjusting nut and lock washer.
Fig. 25, is a sectional view of the hand operating knob.
Fig. 26, is an inverted plan view of a portion of the trigger plate.

The said knob 45, may, if desired, be provided with a screw 45', as shown in Fig. 25, which can be made to engage with the slide, so that when it is screwed in, the slide and knob move together in both forward and rear directions, but when unscrewed, the slide and knob become independent of each other.

The sear 34 is connected to the trigger-plate 26' by the pivot pin 47, the sear spring 48 serving to force the sear up into engagement with the cock-notch or recess 32 in the slide, and the trigger 49 serving to force the sear out of engagement with said notch when the trigger is pulled.

The rear end of the sear is formed with integral side arms 33, which are adapted to enter recesses formed in the walls of the receiver. When the trigger-plate 26' is pushed forward in the groove 50 formed in the receiver, the cam shaped surface 51 forces the sear down into the clearance recess formed in the trigger-plate, and the plate and parts carried thereon can be slid forward in the receiver until the side arms 33 of the sear register with the recesses, when the sear spring will lift the extended arms of the sear into the recesses in the receiver. This prevents the trigger-plate from being forced back toward the rear end of the receiver by the pressure of the main spring.

In order to release the plate 26' so that it can be slid back out of the receiver, all that is necessary is to pull the trigger, which forces the sear arms down and out of engagement with the shouldered recesses in the receiver, and thus allow the said plate and sear to slide rearwardly out of the receiver.

The trigger 49 is pivoted to the trigger-plate by a pin 52. The rear end of the trigger is provided with a shoulder 54 which is engaged by the safety-slide 55 for the purpose of locking the mechanism against discharge. This safety-slide is carried in a slot formed in the trigger-plate and is provided with a push-button 56 which extends through the safety slot in the trigger-plate, and by this button it may be slid or moved to either the "safe" or "ready" position by the operator. This safety-slide is formed with two small conical shaped recesses 57, on the under side of the slide, into which recesses a spring actuated plunger 58 engages for the purpose of holding the safety in either its forward (safe) position, or rear (ready) position. A reasonable amount of pressure on the safety-button by the operator will force the spring actuated plunger down, and cause the safety to slide into the desired position when the plunger will seat itself in the recess and hold the safety in the position to which it is moved.

The trigger plate 26' is also provided with an upwardly extending lug 59 which carries the main-spring guide rod 27. This guide rod is riveted or suitably fastened to the lug on the trigger plate at 60 and the said rod serves the purpose of a guide or support for the rear end of the main spring. This guide rod is screw-threaded at 61, and is also provided with a key-way or longitudinal groove 62, and it carries the spring adjusting nut 28, and lock-washer 27'. The adjusting nut is screw-threaded and by screwing it forward on the guide rod 27 the tension of the main spring is increased, while by screwing it rearwardly the spring tension is decreased. In order to prevent this nut 28 from turning after the adjustment is properly set, a lock-washer 27' is placed between the end of the spring and the nut which washer is provided with a lug or key 63, which rests within the longitudinal groove 62 and prevents its turning, but allows it to move forward or backward on the rod. The adjusting nut is provided with a locking slot or groove 64 on the side next to the lock washer, and the lock washer is provided with an extension 65, which is forced into the locking slot in the nut by the pressure of the main spring, thus preventing the nut from turning.

The rear end of the trigger plate is also provided with a locking button 66, which works back and forth in a groove or slot formed in the rear end of the plate. This button is formed with a conical or beveled locking end 67, which extends beyond the back end of the plate for the purpose of engaging with the recess 69 for locking the metal head 70 of the gun stock 71 into the receiver. This locking button is held up to its work by a small helical spring 72, and it is held in the plate by the retaining pin 73, which extends through a slot in the button, thus limiting its sliding movement.

The rear end of the trigger-plate is slightly beveled at 74, so that when the metal head of the stock is slid down into the receiver it will come into contact with this beveled end of the trigger plate, and wedge the whole plate slightly forward, which insures it taking its proper seat in the receiver, and also takes the pressure off the sear-arms.

The wood stock 71 is fastened by a screw to the metal head 70 which head is provided with shoulders 75 fitted in the grooves 76 milled in the rear end of the receiver. To remove the stock all that is necessary is to push the lock button 66 forward and out of engagement with the recess in the stock head, and the stock may then be slid up and out of the receiver. This opens the whole back end of the receiver, and the trigger-plate may then be removed and all the rest of the mechanism taken out, all of which is accomplished without any tools of any kind, not even a cartridge being necessary to take the gun apart.

At the front end of the receiver a small sliding plate 77 is provided, and this front plate serves the double purpose of closing the front end of the receiver and locking the barrel, so that when the barrel is screwed in proper register with the other parts it cannot become unscrewed while the front plate is in position. The said front plate is shown in detail in Fig. 16, and is formed with lugs or extensions 78, which are slid vertically into engagement with the grooves or guide-ways 79 formed in the front end of the receiver. The front plate is also provided with an upwardly extended lug or locking stud 80, which passes through an opening in the receiver, and into a shallow recess or seat 81 formed in the rear portion of the gun-barrel, said recess being in register with the opening drilled in the receiver. The front plate is also provided with an opening through which the slide is free to reciprocate, and it is also provided with a shallow recess 82 which serves as an abutment and seat for the rear end of the gas tube or cylinder. The front plate 77 is further provided with a seat 83 for the front end of the trigger-plate, the lower surface of said seat consisting of a slightly beveled step 84, or shoulder, so that when assembling these parts if the front plate should not be entirely up in its seat, the front end of the trigger-plate which is also slightly beveled at 85, will wedge the front plate up, thereby locking the barrel against unscrewing.

The breech-bolt carries the usual extractor 86, which is common in guns of this general type except that the front end of the extractor is slightly reduced at 87 in order that it will not strike against the metal in the receiver when it raises above the outside diameter of the bolt in springing over the head of the cartridge. Along other points the extractor lays flush with the outside of the bolt so that it can travel and rotate with the bolt and be supported in its work by the metal in the receiver surrounding the bolt. The extractor is formed with the usual retaining stud which engages with the hole in the front portion of the bolt. In order to remove the extractor it is sprung away from the bolt far enough to allow the retaining stud to come entirely out of the hole in the bolt when it may be readily slid forward and entirely clear of the bolt. It is apparent that by making the reduced front end of the extractor so that it will just have clearance enough to snap over the head of the cartridge but not enough to lift the retaining stud out of the hole in the bolt, the common defect of springing out of the hole in the bolt while going over the head of the cartridge is prevented.

The ejector 88 is located in the receiver and is of the type common to rotary bolt guns. The pin 89 which holds the ejector in the receiver is of new construction which prevents it from falling out but permits it being readily pushed out when desired. Said ejector pin 89 is formed with a head 90 which prevents it from dropping down through the ejector pin hole drilled in the receiver, and at its extreme lower end it is split and these split ends 91 are spring tempered and formed with small rounded lugs which spring out and prevent the pin from jarring up and out of the receiver. The ejector pin hole in the receiver is formed with a counterbored section so that the spring ends of the pin can expand therein. The body of the pin is fully supported by the walls of the pin hole in the receiver and the split section of the pin is below the point where the extractor turns on it. It is readily evident that an upward push on the lower end of the pin will cause the split ends to spring inward into the pin hole when the pin may then be pushed up through the hole and out of the receiver.

The receiver 2 is formed with the usual ejection slot or opening 92 in the side thereof through which the empty cartridge shells are ejected and with a feed slot or opening in the top through which the cartridges are fed down from the magazine 93. This feed slot or opening 94 is formed with two retaining shelves 95 on which the cartridge rests when it is first fed down from the magazine, and when resting on these shelves the head of the cartridge projects downward in the path of the forward travel of the breech-bolt so that when the bolt moves forward it pushes the cartridge along the shelves until the bullet end has started to enter the cartridge chamber in the gun-barrel at which point the shell is pushed off the front end of these shelves and into the chamber.

The portion of the receiver between the front end of the feed slot and the chamber is formed so as to guide the cartridge to the chamber and as the cartridges are held on the retaining shelves by the pressure of the magazine spring until they are pushed into the chamber by the bolt, it is readily obvious that the gun may be fired in any position, even when upside down.

The receiver 2 is further provided with a stud or post 96 on which the cartridge magazine 93 is carried. This post 96 is provided with a key 97 which engages with a key-way formed in the stationary part of the magazine so that the feed slot in the magazine must register with the feed slot in the receiver when the magazine is on the gun.

The post is formed with a slight taper so that a slight upward lift on the magazine will cause it to be disengaged from the post more freely than if it were not tapered. The post is also provided with a magazine fastener or slide which serves to hold the magazine on the gun, and said fastener consists of a fastener button 98, the fastener spring 99 and the pin 100. The button is knurled on its top so that it can be readily pushed back with the operator's thumb and it is also formed with a slight bevel on top so that the magazine will force it back when being placed on the gun. The button is also formed with a locking shoulder 101 which snaps over the top of the magazine and prevents it coming off the post until the button is pushed back against the coil spring which keeps it up to its work.

By reference to Figs. 1, 2, 3 and 27 it will be seen that an additional means for securing the cartridge magazine to the gun is shown, said means consisting of an upwardly extending lug 102 formed on the gun frame, to which lug is pivoted a spring operated latch lever 103 which is adapted to be engaged with the stationary part of the magazine, thereby furnishing additional means for rigidly fastening the magazine to the gun frame.

By reference to Figs. 3 and 23, it will be seen that the piston rod is provided at the rear of the piston head 17 with several piston rings 104, which serve to catch any gas which may escape around the piston head. This piston head 17 fits the gas tube or casing 18 tightly at its rear end but the front part is turned down slightly to allow clearance between said head and the gas tube so that if the front end of either the tube or piston head should become fouled or coated with powder residue or any foreign substance, the clearance between these parts will prevent them from binding. The extreme front end of the piston head is also cupped out at 105 so as to get the best and most forcible action of the powder gases.

It will be readily perceived that the operation of the gun mechanism, and the assembling and disassembling of the parts of the gun may be readily understood by any one skilled in the art without any additional or further description.

Having thus described our invention what we claim and desire to secure by Letters Patent is:—

1. In a gas-operated machine gun, a reciprocating slide provided with upright spaced extensions, a breech bolt, and a firing-pin having a flattened portion near its rear end adapted to be fitted between said extensions, said firing-pin carrying means for rotating and reciprocating said breech bolt.

2. In a gas-operated machine gun, a reciprocating slide having upright separated extensions, a breech bolt, and a firing-pin moved longitudinally by said slide having a flattened portion near its rear end adapted to rest between said extensions, said firing-pin carrying a cross-pin for rotating and reciprocating the breech-bolt.

3. In a gas-operated machine gun, a reciprocating slide having vertical spaced extensions, a breech bolt, and a firing pin having a flattened portion near its rear end adapted to rest between said extensions, said firing-pin carrying a cross-pin for rotating and reciprocating said bolt, and to prevent discharging the gun until the breech bolt is locked.

4. In a gas-operated gun, a reciprocating slide provided with upright spaced extensions adapted to straddle and carry a firing pin, said firing pin being flattened near its rear end portion and adapted to rotate and reciprocate a breech-bolt.

5. In a gas-operated gun, a reciprocating slide provided with upright separated extensions, a rotatable and reciprocating breech-bolt, a firing pin provided with a flattened portion near its rear end, and means carried by the firing pin for rotating and reciprocating said breech-bolt.

6. In a gas-operated gun, a reciprocating slide provided with vertical spaced extensions, a rotatable and reciprocating breech-bolt, a firing pin having a flattened portion near its rear end, and a pin carried by the firing pin for actuating said breech-bolt.

7. In a gas-operated gun, a reciprocating slide provided with vertical separated extensions, a rotatable and reciprocating breech-bolt provided with operating cam slots, a firing pin having a flattened portion near its rear end, a means carried by the firing pin adapted to engage said cam slots for actuating said breech-bolt.

8. In a gas-operated gun, a reciprocating slide provided with upright spaced extensions, a rotatable and reciprocating breech-bolt provided with elongated cam slots through its wall, a firing pin having a reduced flattened portion near its rear end, and a pin carried by the firing pin adapted to engage said cam slots for actuating said breech-bolt.

9. In a gas-operated gun, a reciprocating slide provided with upright separated extensions, a rotatable and reciprocating breech-bolt provided with a plurality of cam slots, a firing pin flattened near its rear end portion having an opening therethrough, and a pin passing through said opening in the firing pin and engaging with said cam slots for actuating said breech-bolt.

10. In a gas-operated gun, a reciprocating slide provided with upward spaced extensions and a lower tubular portion, a rotatable and reciprocating breech-bolt, a firing pin having a reduced flattened portion near its rear end fitted between said spaced extensions, and means carried by the firing pin for actuating said breech-bolt.

11. In a gas-operated gun, a reciprocating slide provided with a tubular lower portion extending throughout its length and upright separated extensions adapted to straddle and carry a firing pin, said firing pin having a reduced flattened portion near its rear end and serving to rotate and reciprocate a breech-bolt.

12. In a gas-operated gun, a reciprocating slide provided with upright spaced extensions, and a firing pin having flattened side portions near its rear end fitted between said extensions, and removable means carried by the firing pin for actuating a breech-bolt.

13. In a gas-operated gun, a reciprocating slide provided with vertical separated extensions at its rear end portion, a firing pin having flattened side portions near its rear end fitted between said extensions, and removable means carried by said pin for actuating a breech-bolt.

14. In a gas-operated gun, a reciprocating slide provided with vertical spaced extensions, and a firing pin having flattened side portions near its rear end and fitted between said spaced extensions, and carrying means for actuating a breech-bolt.

15. In a gas-operated gun, a reciprocating slide provided with vertical separated extensions and a tubular lower portion extending throughout its length, a firing pin having flattened side portions near its rear end and fitted between said extensions, and a removable cross-pin carried by the firing pin for actuating a breech-bolt.

16. In a gas-operated gun, a reciprocating slide provided with vertical spaced extensions at its rear end portion and a tubular lower portion extending its entire length, and a firing pin having reduced flattened side portions near its rear end fitted between said spaced extensions, and carrying means for actuating a breech-bolt.

17. In a gas-operated gun, a reciprocating slide provided with upright separated extensions, a firing pin having flattened side portions near its rear end fitted between said separated extensions, and a pin having reduced end portions carried by said firing pin adapted to actuate a breech-bolt.

18. In a gas-operated gun, a reciprocating slide provided with vertical separated extensions, a firing pin having flattened side portions near its rear end fitted between said separated extensions, a rotatable and reciprocating breech-bolt, and means carried by the firing pin for actuating said breech-bolt.

19. In a gas-operated gun, a reciprocating slide provided with vertical spaced extensions at its rear end portion, a firing pin having flattened side portions near its rear end fitted between said spaced extensions, a rotatable and reciprocating breech-bolt provided with cam slots, and means carried by the firing pin to engage said cam slots and actuate the breech-bolt.

20. In a gas-operated gun, a reciprocating slide provided with upright separated extensions and a tubular lower portion extending its entire length, a firing pin having flattened side portions near its rear end which are straddled by said separated extensions, a breech-bolt provided with cam slots, and means fitted within the firing pin to rotate and reciprocate said breech-bolt.

21. In a gas-operated gun, a reciprocating slide provided with vertical separated extensions and a tubular lower portion extending its entire length, a firing pin having flattened side portions near its rear end fitted between said separated extensions, a breech-bolt provided with cam slots, and a pin fitted within an opening in said firing pin adapted to engage said cam slots to rotate and reciprocate said breech-bolt.

22. In a gas-operated gun, a reciprocating slide having upright-spaced extensions, a firing pin having flattened side portions near its rear end which are straddled by said spaced extensions, a rotatable and reciprocating breech-bolt provided with cam slots, and means carried by the firing pin for engaging said cam slots and actuating the breech-bolt.

23. In a gas-operated gun, a reciprocating slide having vertical separated extensions, a firing pin having flattened side portions near its rear end fitted between said separated extensions, and an opening formed through the firing pin adapted to carry means for actuating a breech-bolt.

24. In a gas-operated gun, a reciprocating slide having upright separated extensions and a tubular lower portion adapted to carry a mainspring therein, a firing pin having flattened side portions near its rear end which are straddled by said separated extensions, a rotatable and reciprocating breech-bolt, and an opening formed through the firing pin adapted to carry means for rotating and reciprocating said breech-bolt.

25. In a gas-operated gun, a reciprocating slide having upright separated extensions, a rotatable and reciprocating breech-bolt provided with cam slots having an enlarged opening at their forward ends, a firing pin provided with reduced flattened side portions near its rear end fitted between said separated extensions, said firing pin carrying breech-bolt operating means which may be removed therefrom through said enlarged openings.

26. In a gas-operated gun, a reciprocating slide having vertical spaced extensions, a breech-bolt having cam slots therein provided with an enlarged opening at their forward ends, and a firing pin provided with reduced flattened side portions near its rear end fitted between said spaced extensions, said firing pin having breech-bolt operating means which may be removed through said enlarged openings.

27. In a gas-operated gun, a reciprocating slide having upright spaced extensions, a breech-bolt having cam slots therein provided with an enlarged opening at their forward ends, and a firing pin with flattened side portions near its rear end adapted to be embraced by said spaced extensions and an opening therethrough adapted to receive a pin for actuating said breech-bolt, said pin having reduced end portions and being removable through the enlarged openings.

28. In a gas-operated gun, a slidably removable trigger-plate having a longitudinal guide pin rigidly secured thereto, said trigger-plate serving to close the bottom portion of the gun frame or receiver, and a slidably removable plate for closing the front of the gun frame.

29. In a gas-operated gun, a receiver, a slidably removable trigger-plate serving to close the bottom portion of the receiver, a longitudinal guide pin rigidly secured to the trigger-plate and adapted to carry one end of the mainspring, and a slidably removable plate for closing the front of the receiver.

30. In a gas-operated gun, a receiver, a slidably removable trigger-plate serving to close the bottom of said receiver, a longitudinal guide pin rigidly secured to the trigger-plate, means secured to said guide pin for adjusting the tension of the mainspring, and slidably removable means for closing the front of the receiver carrying means for locking the gun-barrel to said receiver.

31. In a gas-operated gun, a receiver, a slidably removable trigger-plate serving to close the bottom of said receiver, a longitudinal guide pin rigidly secured to the trigger-plate, adjusting means secured to and carried by said pin for regulating the tension of the mainspring, and slidably removable means for closing the front of the receiver.

32. In a gas-operated gun, a receiver, a slidably removable trigger-plate adapted to close the bottom of the receiver, a sear carried by said plate provided with means adapted to engage recesses in the receiver to secure the plate therein, a longitudinal guide pin rigidly secured to the rear portion of the trigger-plate and serving to carry and guide one end of the mainspring, and means secured to the guide pin for regulating the tension of said mainspring.

33. In a gas-operated gun, a receiver, a slidably removable trigger-plate adapted to close the bottom of the receiver, a sear carried by said plate provided with side arms adapted to engage with recesses formed in the receiver to secure the plate therein, a longitudinal guide pin rigidly secured to the said plate serving to carry and guide one end of the mainspring, and an adjusting nut and lock washer secured to said pin for regulating the tension of the mainspring.

34. In a gas-operated gun, a receiver, a slidably removable trigger-plate forming the bottom portion of the receiver, a longitudinal guide pin rigidly secured to said plate serving to carry and guide one end of the mainspring, and adjusting nut and lock washer fitted to said pin for regulating the tension of the spring, means for locking the trigger-plate to the metal head of the gun stock, and slidably removable means for closing the front of the receiver and locking the gun-barrel to said receiver.

35. In a gas-operated gun, a receiver, a trigger-plate forming the bottom of the receiver, and a sear pivoted to said plate and provided with laterally extended side arms adapted to engage with recesses formed in the receiver to secure the plate temporarily in the receiver.

36. In a gas-operated gun, a receiver, a trigger-plate forming the bottom of the receiver, a spring-pressed sear pivoted to said plate and having laterally extended arms adapted to enter recesses formed in the receiver and hold the plate temporarily in the receiver, and means carried by the plate for locking said plate to the metal head of the gun stock.

37. In a gas-operated gun, a receiver, and a slidably removable front plate for closing the front of the receiver and provided with means for locking the gun-barrel to said receiver.

38. In a gas-operated gun, a receiver, a slidably removable front plate for closing the front of the receiver, and an integral upwardly extending portion adapted to lock the gun-barrel to said receiver.

39. In a gas-operated gun, a receiver, a slidably removable front plate for closing the front of the receiver, an upwardly projecting pin forming a part of said plate adapted to enter a recess in the gun-barrel to lock same to the receiver, said plate having lateral extensions adapted to engage with the grooves formed in the front end of the receiver.

40. In a gas-operated gun, a receiver, a slidably removable front plate for closing the front of the receiver, an integral upwardly projecting pin passing through an opening in the receiver and adapted to enter a recess formed in the gun-barrel in register with the said opening, thereby locking the barrel against unscrewing, an opening in said plate to allow a slide to reciprocate, and a recess formed in the front of the plate to serve as a seat for the gas tube or casing.

41. In a gas-operated gun, a receiver, a reciprocating slide, a breech-bolt, a firing pin, and a pin carried by the firing pin for actuating the breech-bolt, said pin having reduced ends and an enlarged body portion which prevents the accidental displacement or removal of said pin during the operation of the slide.

42. In a gas-operated gun, a receiver, a reciprocating slide, a breech-bolt provided with cam slots, a firing pin, and a breech-bolt actuating pin fitted within the firing pin having reduced ends and an enlarged body portion whereby the said actuating pin is held from accidental removal.

43. In a gas-operated gun, a receiver provided with a longitudinal slot in one side thereof, a reciprocating slide having an extended tubular front portion and a squared rear portion, a loose sliding ring fitted around said tubular portion adapted to contact with the front of the squared portion having a reduced neck portion adapted to engage with the slot in the side of the receiver, and a hand operating knob projecting outward from said neck portion at the side of the receiver.

44. In a gas-operated gun, a receiver provided with a longitudinal slot in one side thereof, a reciprocating slide having a tubular front portion and a squared rear portion, a loose sliding ring fitted around said tubular portion and adapted to contact with the said squared portion, said ring having a reduced neck portion fitted in the slot in the receiver, a hand operating knob projecting outward from said neck portion, and means carried by the ring for securing the slide and ring together.

45. In a gas-operated gun, a gun-barrel air cooling means comprising two cylindrical casings, two sleeves surrounding said barrel within said casings, each sleeve having a series of spirally arranged integral longitudinal ribs radiating therefrom, and a ring rigidly secured to the barrel intermediate its length for connecting one end of each sleeve and one end of each of said casings.

46. In a gas-operated gun, the gun-barrel air cooling means comprising two cylindrical casings, two sleeves surrounding said barrel within said casings, each sleeve having a series of integral spirally arranged longitudinal ribs radiating therefrom, and a ring rigidly secured to the barrel intermediate its length for connecting one end of each sleeve and one end of each of said casings, said ring being provided with a gas outlet port registering with the outlet port in the gun-barrel.

47. In a gas-operated gun, the gun-barrel air cooling means comprising two cylindrical casings surrounding the barrel, two sleeves within said casings surrounding the barrel, each sleeve having a series of integral spirally arranged longitudinal ribs radiating therefrom, a ring rigidly secured to the barrel intermediate its length for connecting one end of each sleeve and one end of each of said casings, said ring having a vertical and a longitudinal gas outlet port registering with the outlet port in the gun-barrel, and means for regulating the outlet of gas from the ports in said ring.

48. In a gas-operated gun, the gun-barrel air cooling means, the gun-barrel provided with a gas outlet port and a screw-threaded outer end portion, a ring rigidly secured to said barrel provided with semi-circular openings around said barrel for the passage of air, a vertical and a longitudinal gas outlet port formed therein registering with the outlet in the barrel, and means carried by said ring for regulating the outlet of gas from said ports consisting of cup-shaped device secured within the ring provided with graded openings therethrough adapted to register with said longitudinal gas outlet.

49. In a gas-operated gun, the gun-barrel air cooling means, consisting of two sections of cylindrical casings surrounding the barrel, the gun-barrel provided with a gas outlet port, and an integral ring rigidly secured to said barrel surrounding and connected to each of said sections having a vertical and a longitudinal gas outlet, means carried by the ring for regulating the outlet of gas, consisting of a cup-shaped adjusting device fitted within the ring having different sized openings through its walls adapted to register with the longitudinal outlet, and means for locking said cup-shaped device when properly adjusted.

50. In a gas-operated gun, the gun-barrel air cooling means consisting of two sections of cylindrical casings surrounding the barrel, the gun-barrel provided with a gas outlet port, and an integral ring rigidly secured to said barrel surrounding and connected to each of said sections having a vertical and a longitudinal gas outlet, means carried by the ring for regulating the outlet of gas, consisting of a cup-shaped adjusting device fitted within the ring with a plurality of graded openings through its walls adapted to register with the longitudinal outlet, and a spring-pressed locking device adapted to engage openings in the wall of the ring and lock said cup-shaped device when in its properly adjusted position.

51. In a gas-operated gun, the gun-barrel air cooling means consisting of two sections of cylindrical casings surrounding the barrel, a ring secured to the barrel intermediate its length, the rear end of the rear casing being connected to the gun frame and its front end to said ring, and the rear end of the front casing being secured to said ring, two sections of sleeves, each section having a series of integral spirally arranged longitudinal ribs radiating therefrom and surrounding the gun-barrel within said casings, the rear end of the rear sleeve fitted to the gun frame and the front end to said ring, and the front section of the sleeve secured on the outer end of the barrel and connected to the ring by a screw-threaded cup or nut fitted on the outer screw-threaded end of the gun-barrel.

52. In a machine gun, a receiver, a slidably removable plate constituting the bottom portion of said receiver, and a mainspring guide pin, carried by said plate, and serving to hold said main-spring in proper position, and a slidably removable plate for closing the front of the receiver carrying means for locking the gun-barrel.

53. In a machine gun, a receiver, a slidably removal plate, forming the bottom portion of said receiver, means carried by said plate for holding the main-spring in proper position and for adjusting the tension of said spring, and a slidably removable plate for closing the front end of the receiver carrying gun-barrel locking means.

54. In a gas operated machine gun, a receiver, and a slidably removable plate forming the bottom portion of the receiver, said plate carrying means for guiding and adjusting the tension of the main-spring, a sear, and means whereby the sear holds the said plate in the receiver.

55. In a machine gun, a removable plate forming the bottom portion of the receiver, a trigger, a sear to hold the plate in the receiver, and a safety slide for locking said trigger, carried in said removable plate.

56. In a machine gun, a removable plate carrying a sear and means whereby the sear serves to hold the plate in the receiver.

57. In a machine gun, a gas operated slide provided with an elongated tubular portion and a squared portion, and a member which slips over the end of the slide and abuts against said squared portion, said member extending through the receiver at one side thereof for the purpose of hand operating the gun, and permitting the slide to reciprocate through the said member without moving it back and forth when the gun is operated automatically.

58. In a gas-operated machine gun, a receiver, a slidably removable bottom plate fitted to said receiver carrying a guide rod for guiding the mainspring, a sear, and means whereby the sear holds said plate in the receiver.

59. In a gas-operated machine gun, a receiver, a slidably removable bottom plate fitted to said receiver carrying a guide rod for guiding the mainspring, means mounted on the guide rod for adjusting the tension of said mainspring, a sear, and means whereby the sear serves to hold said plate in the receiver.

60. In a gas-operated machine gun, a receiver, a slidable bottom plate for said receiver, said bottom plate carrying a stationary horizontally arranged mainspring guide rod, and means mounted on said guide rod for adjusting the tension of the mainspring, and means formed in said receiver for securing said bottom plate to the receiver.

61. In a gas-operated machine gun, a receiver, a slidable bottom plate for said receiver carrying a stationary screw-threaded mainspring guide rod, means mounted on said guide rod for adjusting the tension of the mainspring, a sear, and means whereby the sear is adapted to hold said plate in the receiver.

62. In a gas-operating machine gun, a slidably removable plate removably secured to the gun stock carrying a stationary horizontal screw-threaded guide rod for the mainspring, means mounted on said screw-threaded rod for adjusting the tension of said mainspring, and means formed in said receiver for securing said bottom plate to the receiver.

ANSLEY H. FOX.
WALTER J. RICE.